United States Patent
Nowozin et al.

(10) Patent No.: US 10,621,416 B2
(45) Date of Patent: Apr. 14, 2020

(54) IMAGE PROCESSING FOR PERSON RECOGNITION

(71) Applicant: Microsoft Technology Licensing, LLC, Redmond, WA (US)

(72) Inventors: Sebastian Nowozin, Cambridge (GB); Tom Ellis, Cambridge (GB); Cecily Peregrine Borgatti Morrison, Cambridge (GB); Daniel Coelho De Castro, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 15/723,144

(22) Filed: Oct. 2, 2017

(65) Prior Publication Data
US 2019/0102606 A1    Apr. 4, 2019

(51) Int. Cl.
| | |
|---|---|
| G06K 9/00 | (2006.01) |
| G06N 3/08 | (2006.01) |
| G06N 5/04 | (2006.01) |
| G06K 9/62 | (2006.01) |
| G06N 20/00 | (2019.01) |

(52) U.S. Cl.
CPC ..... *G06K 9/00268* (2013.01); *G06K 9/00295* (2013.01); *G06K 9/00677* (2013.01); *G06K 9/6218* (2013.01); *G06K 9/6277* (2013.01); *G06N 3/088* (2013.01); *G06N 5/04* (2013.01); *G06N 20/00* (2019.01); *G06K 9/00684* (2013.01)

(58) Field of Classification Search
CPC .......... G06K 9/00268; G06K 9/00295; G06K 9/6218; G06N 20/00; G06N 3/088; G06N 5/04
See application file for complete search history.

(56) References Cited

U.S. PATENT DOCUMENTS

| | | | |
|---|---|---|---|
| 9,530,100 B2 | 12/2016 | Soon-Shiong et al. | |
| 2013/0262588 A1* | 10/2013 | Barak | H04L 67/22 709/204 |
| 2015/0193471 A1 | 7/2015 | Shochat et al. | |
| 2015/0286638 A1* | 10/2015 | Li | G06K 9/00268 382/190 |

(Continued)

OTHER PUBLICATIONS

Andreopoulos, et al., "50 Years of object recognition: Directions forward", In Proceedings of Computer Vision and Image Understanding, vol. 117, Issue 8, Aug. 2013, pp. 1-100.

(Continued)

*Primary Examiner* — Ping Y Hsieh

(57) ABSTRACT

An image processing system is described which has a memory holding at least one image depicting at least one person previously unseen by the image processing system. The system has a trained probabilistic model which describes a relationship between image features, context, identities and a plurality of names of people, wherein at least one of the identities identifies a person depicted in the image without an associated name in the plurality of names. The system has a feature extractor which extracts features from the image, and a processor which predicts an identity of the person depicted in the image using the extracted features and the probabilistic model.

20 Claims, 11 Drawing Sheets

(56) References Cited

U.S. PATENT DOCUMENTS

2017/0140213 A1* 5/2017 Brandt ............... G06K 9/00295
2018/0285690 A1* 10/2018 Goswami ............ G06K 9/6262

OTHER PUBLICATIONS

Chapelle, et al., "Semi-Supervised Learning", In Publication of MIT Press, 2006, 524 Pages.

Choi, et al., "Face Annotation for Personal Photos Using Context-Assisted Face Recognition", In Proceedings of the 1st ACM SIGMM International Conference on Multimedia Information Retrieval, Oct. 30, 2008, pp. 44-51.

Frénay, et al., "Classification in the Presence of Label Noise: A Survey", In Journal of IEEE Transactions on Neural Networks and Learning Systems, vol. 25, Issue 5, May 2014, pp. 845-869.

Galleguillos, et al., "Context based object categorization: A critical survey", In Journal of Computer Vision and Image Understanding, vol. 114, Issue 6, Jun. 2010, pp. 1-11.

Naaman, et al., "Leveraging Context to Resolve Identity in Photo Albums", In Proceedings of the 5th ACM/IEEE-CS Joint Conference on Digital Libraries, Jun. 7, 2005, 10 Pages.

Perdikis, et al., "Context-aware learning for finite mixture models", Retrieved From <<https://arxiv.org/pdf/1507.08272.pdf>>, Retrieved on: Jul. 29, 2015, pp. 1-43.

Pitman, et al., "The Two-Parameter Poisson-Dirichlet Distribution Derived from a Stable Subordinator", In Journal of Annals of Probability, vol. 25, Issue 2, Apr. 1997, pp. 855-900.

Schwarze, et al., "Role-based identity recognition for TV broadcasts", In Journal of Multimedia tools and applications, vol. 63, Issue 2, Mar. 2013, 16 Pages.

Tapaswi, et al., ""Knock! Knock! Who is it?" Probabilistic Person Identification in TV-Series", In Proceedings of the IEEE Conference on Computer Vision and Pattern Recognition, Jun. 16, 2012, pp. 1-8.

Teh, et al., "Dirichlet Process", In Publication of Springer, 2011, pp. 1-13.

Teh, et al., "Hierarchical Dirichlet Processes", In Journal of the American Statistical Association, vol. 101, Issue 476, Dec. 2006, pp. 1566-1581.

Torralba, et al., "Context-based vision system for place and object recognition", In Proceedings of the Ninth IEEE International Conference on Computer Vision, Oct. 13, 2003, pp. 1-8.

Wang, et al., "Unsupervised Activity Perception in Crowded and Complicated Scenes Using Hierarchical Bayesian Models", In Journal of IEEE Transactions on Pattern Analysis and Machine Intelligence, vol. 31, Issue 3, Mar. 2009, pp. 539-555.

Zhang et al., "Context-based person identification framework for smart video Surveillance", In Journal of Machine Vision and Applications, vol. 25, Issue 7, Oct. 2014, 15 Pages.

Amos, et al., "OpenFace: A general-purpose face recognition library with mobile applications", School of Computer Science, Carnegie Mellon University, Jun. 2016, 20 pages.

Bouveyron, Charles and Girard, Stéphane, "Robust supervised classification with mixture models: Learning from data with uncertain labels", 2008. <hal-00325263v1>, 26 pages.

A. Dai and A.J. Storkey, "The supervised hierarchical Dirichlet process", IEEE Transactions on Pattern Analysis and Machine Intelligence, 37(2):243-255, 2015.

Nguyen, et al., "Bayesian Nonparametric Multilevel Clustering with Group-Level Contexts", In Proceedings of the 31st International Conference on Machine Learning, 2014, pp. 1-9.

Anguelov, et al., "Contextual Identity Recognition in Personal Photo Album", In Proceedings of the IEEE Conference on Computer Vision and Pattern Recognition, Jun. 17, 2007, 7 Pages.

Choi, et al., "Automatic Face Annotation in Personal Photo Collections Using Context-Based Unsupervised Clustering and Face Information Fusion", In Proceedings of the IEEE Transactions on Circuits and Systems for Video Technology, vol. 20, Issue 10, Oct. 1, 2010, 18 Pages.

De Castro, et al., "From Face Recognition to Models of Identity: A Bayesian Approach to Learning about Unknown Identities from Unsupervised Data", In Proceedings of the 15th European Conference on Computer Vision, Jul. 20, 2018, 17 Pages.

"International Search Report and Written Opinion Issued in PCT Application No. PCT/US2018/052511", dated Jan. 17, 2019, 15 Pages.

Wang, et al., "Seeing People in Social Context: Recognizing People and Social Relationships", In Proceedings of the 11th European conference on Computer vision: Part V, Sep. 5, 2010, pp. 169-182.

Zhao, et al., "Automatic Person Annotation of Family Photo Album", In Proceedings of the 5th International Conference on Image and Video Retrieval, Jul. 13, 2006, 10 Pages.

* cited by examiner

IMAGE PROCESSING FOR PERSON RECOGNITION

BACKGROUND

Image processing systems which recognize faces in images and videos typically operate by extracting facial features from the images and applying template matching or classification. In the case of template matching a library of templates is available with each template being annotated as representing the face of a specified person. When extracted facial features from an incoming image match a particular template the system recognizes the face of the person associated with the template. In the case of classification an automated classifier such as a neural network is trained in advance using huge quantities of images depicting faces of specified people. In order to annotate the templates or annotate the training images significant time and expense is involved. These types of face recognition systems work well in controlled environments where the lighting is good and the person is facing the camera but are often not robust where lighting changes, occlusion, and different camera viewpoints occur.

Existing face recognition systems do not behave or operate in the same way as a human does. As a result the functionality of such face recognition systems is limited as compared with a human who is trying to recognize individuals. Also, because existing face recognition systems do not behave or operate in the same way as a human does the existing face recognition systems are not intuitive to use or integrate with other automated systems.

The embodiments described below are not limited to implementations which solve any or all of the disadvantages of known image processing systems for person recognition.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An image processing system is described which has a memory holding at least one image depicting at least one person previously unseen by the image processing system. The system has a trained probabilistic model which describes a relationship between image features, context, identities and a plurality of names of people, wherein at least one of the identities identifies a person depicted in the image without an associated name in the plurality of names. The system has a feature extractor which extracts features from the image, and a processor which predicts an identity of the person depicted in the image using the extracted features and the probabilistic model.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
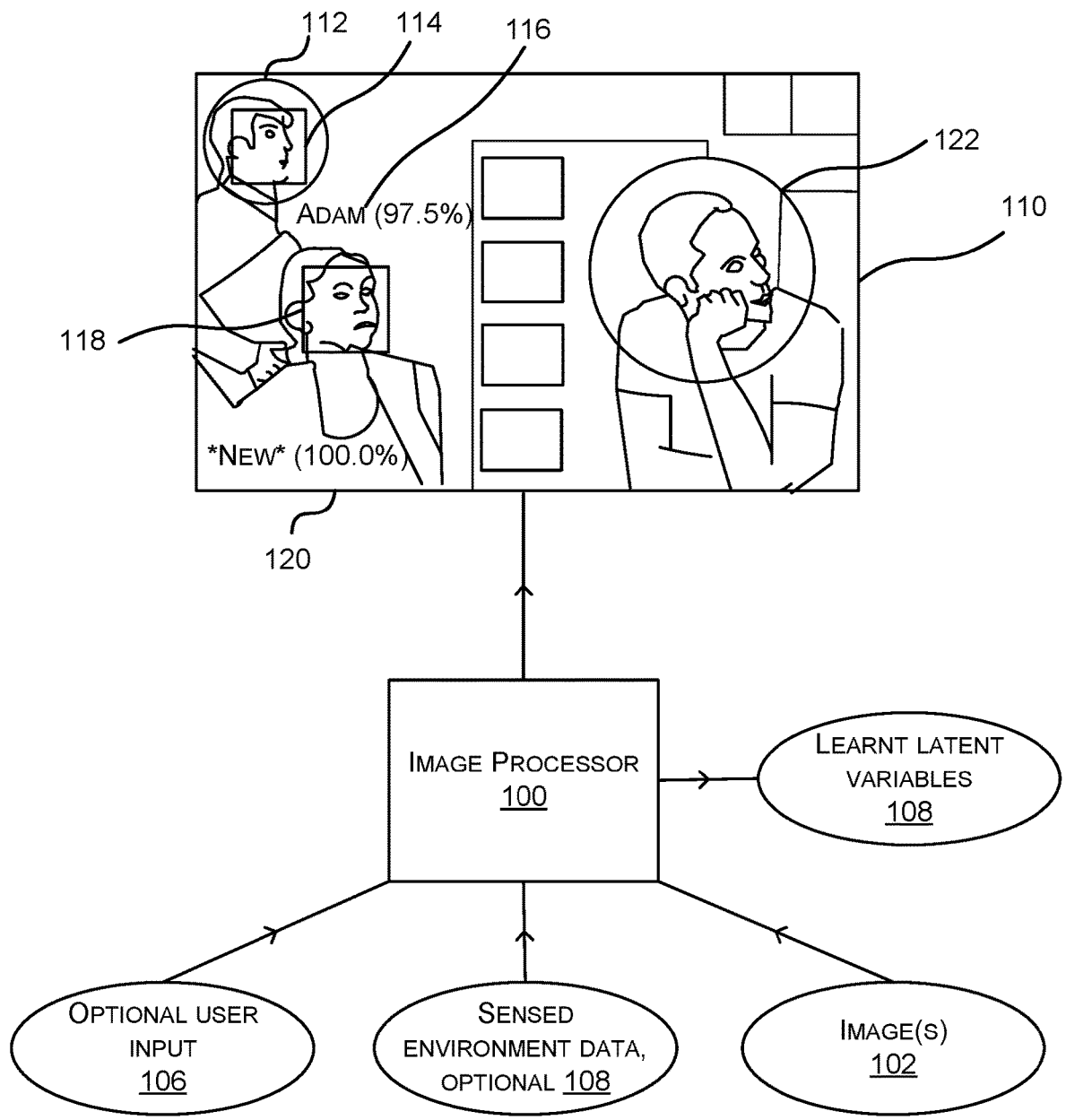
FIG. 1 is a schematic diagram of an image processor for person recognition.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The technology described herein uses images and videos of people and stores names of people and identifiers of people. Users of the technology, and those people observed in the images and videos may give their consent to the use of the technology in advance and are made aware of the type of data which will be stored. Privacy concerns and sensitivity of data is fully taken into account.

The methods herein, which involve the observation of people in their daily lives, are enacted with utmost respect for personal privacy. Accordingly, the methods presented herein are fully compatible with opt-in participation of the persons being observed. In embodiments where personal data is collected on a local system and transmitted to a remote system for processing, that data is encrypted in a known manner. In other embodiments, personal data is confined to a local system, and only non-personal, summary data transmitted to a remote system.

Consider a scenario where a partially or fully sighted user moves to a new city or goes to a cocktail party. The user meets a person and often experiences difficulty naming the person or recalling whether he or she has met the person before. If the user commutes by public transport to work he or she encounters other commuters on a regular basis but typically does not know their names. If the user enters a medical clinic he or she encounters a person that was encountered on the previous visit to the same clinic, but the user does not know the name of that person. The user is often able to use reasoning to infer the names of people, such as by using context. The context includes things like the situation the user is in such as a lunchtime context, a garden context, a swimming pool context and has associated information about what people are likely to be encountered in each of the different contexts.

The present technology recognizes the problem that existing face recognition systems are not human-like in a variety of ways, such as the ability to make inferences using context and/or the ability to recognize a familiar stranger. A familiar stranger is a person who has been encountered before but for whom no name is known. The ability to make inferences is very powerful and people are able to use environment context such as time of day and/or the geographical location. Environment context also includes the type of environment such as medical clinic, public transport, office, garden.

In order to enable the present technology to make inferences a probabilistic model is used so that inference is able to be computed using the probabilistic model. A probabilistic model comprises a plurality of variables represented using probability distributions. Some of the variables take values which are observed empirically and some of the variables are unobserved, latent variables that take values learnt during training. The probabilistic model is carefully designed so that identities are represented separately from names; and this enables familiar strangers to be taken into account. An identity is a unique identifier assigned by the image processing system to a person. The identifier is a number or other identifier. In contrast, a name is one of a plurality of person names stored in the image processing system. By separating identities and names in this way the image processing system is able to make inferences about familiar strangers and so become more human like. The term "person recognition" is used to refer to computing a prediction of a unique identifier and/or name of a person depicted in an image.

Usually in machine learning it is assumed that labels are error-free, such as the name labels of the people depicted in the images in the present case. However, the present technology explicitly models that the user may make errors, and some users may make more errors then others. This is done using so a naming model with a noise parameter that is either constant over time or slowly changes over time.

FIG. 1 is a schematic diagram of an image processor 100 which is computer implemented. The image processor receives as input one or more images 102 such as video, color camera images, depth images, or other images. The image processor optionally receives as input sensed environment data 104 such as light sensor data, global positioning sensor data, pressure sensor data, accelerometer data, touch sensor data, time data, or other sensed environment data 104. The image processor optionally receives user input 106 comprising names of people in particular images, but this is not essential as the image processor is able to operate in an unsupervised manner.

The image processor comprises a probabilistic model as mentioned above and which is described below in more detail. The image processor uses the inputs it receives to update observed variables of the probabilistic model and to make inferences to update unobserved variables of the probabilistic model. The unobserved variables are referred to as learnt latent variables 108 and these are available as output of the image processor 100 as indicated in FIG. 1. The probabilistic model is used to compute predictions. The predictions are predictions of any of the variables of the model and this includes one or more of: identities of people depicted in the images 102, names of people depicted in the images 102, contexts, names of people likely to be encountered next or in particular contexts, identities of people likely to be encountered next or in particular contexts. The predictions are provided to the user using audio and/or graphical indications rendered onto a display of the images 102 as illustrated in FIG. 1 or onto an augmented reality display.

In the example of FIG. 1 the red circle 122 indicates a face which is detected by the image processor 100 but for which the image processor identifies that not enough detail is available to compute an accurate identity and/or name of the person (because the face is occluded by a hand). The green circle 122 indicates a face which is detected by the image processor and for which context data is available in the model. The yellow square 114 within the green circle 122 indicates a region of interest computed by the image processor and from which image features are extracted for processing by the probabilistic model. Using the image features from region of interest 114 the image processor 100 computes that the name of the depicted person is Adam with a probability of 97.5%. The image processor 100 also computes region of interest 118 and extracts image features from that region of interest. The features from region of interest 118 are input to the probabilistic model which predicts that the person depicted in region of interest 118 is a new person not previously encountered by the image processor 100 with a probability of 100%.

Suppose that the person in the red circle 122 does not have a hand occluding the face. In this case a region of interest is detected over the face in the red circle 122 and features are extracted from the region of interest. The features are input to the probabilistic model which predicts that the face is the second of two familiar strangers (people who have been encountered before by the image processor 100 but for whom no name is known with high certainty by the image processor 100). In this case the image processor displays the wording "familiar stranger 2" next to the face in red circle 122.

In the example of FIG. 1 face detection is used. However, the image processor uses body detection and body recognition in some examples, either in addition to face detection or as an alternative to face detection.

In some examples the image processor of FIG. 1 is deployed at a server which is in communication with one or more client computing devices, such as smart phones, personal computers, augmented reality head worn computing devices and others. The functionality of the image processor is at the server or is shared between the server and the client computing device.

The image processor of FIG. 1 is deployed in a user device in some examples, such as in an augmented reality head worn computing device or in a smart phone.

Alternatively, or in addition, the functionality of the image processor described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
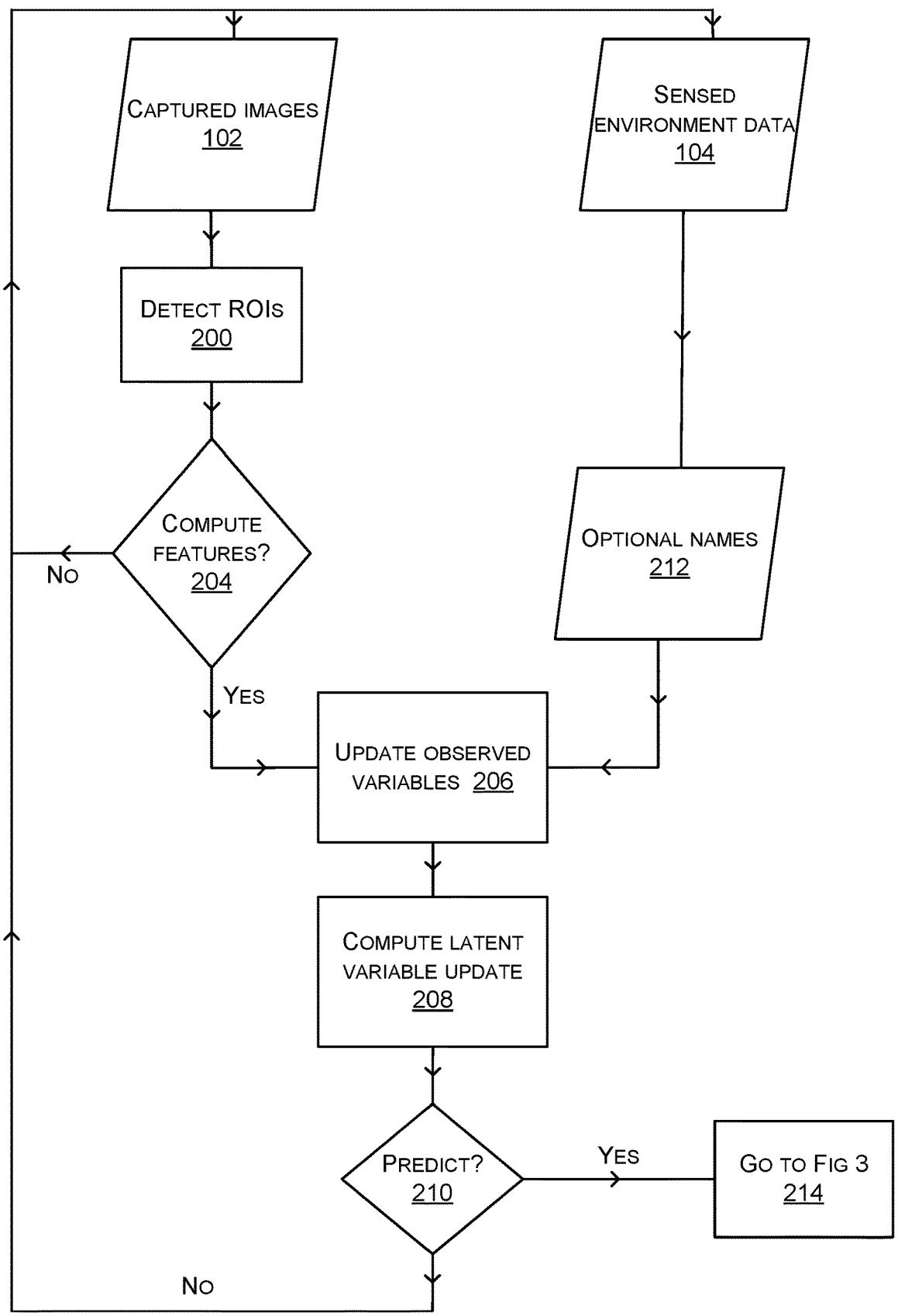
FIG. 2 is a flow diagram of a method of operation at an image processor such as that of FIG. 1.

FIG. 2 is a flow diagram of a method of operation at an image processor such as that of FIG. 1. Captured images 102 are received such as web camera video images and/or depth images from a depth camera. The image processor detects one or more regions of interest (ROIs) in the images. This is done by using a face detector or a body detector. Known face detectors and known body detectors are available. A region of interest is thus a part of an image which is likely to depict a face or a body of a person.

The image processor checks the quality of the detected regions of interest and discards any which have criteria below a specified threshold. For example, this is done by determining the effective resolution of the detected region of interest which is comprised of the pixel resolution and the amount of imaging artifacts present, such as imaging noise and blur. In the case of regions related to face detection additional information such as whether the face is facing towards the camera are utilized to retain regions with enough visible face.

For a given region the image processor computes features. In an example this is done by inputting the region to a neural network which reduces the dimensionality of the image region and outputs a vector of specified length. The neural network has been trained in advance to compute an embedding of an image region into a space of a specified number of dimensions, using known technology.

The image processor also receives sensed environment data 104 associated with the captured images 102 in some cases. That is, the sensed environment data 104 is optional. The image process optionally receives names 212 annotated on one or more of the images 102. Note that the name input 212 is optional as the probabilistic model is able to train using unsupervised training.

The image processor updates 206 observed variables of the probabilistic model using the computed features 204 and where available the sensed environment data 104 and where available the name(s) 212. This is done by incorporating the observed data into the probabilistic model by adding new observed variables to the probabilistic model. Once the observed variables have been updated 206 inference is carried out to compute updates 208 to the latent variables of the probabilistic model. The inference is computed using a Bayesian update process and is achieved through one or more of: message passing algorithms, Markov chain Monte Carlo procedures such as Gibbs sampling or Metropolis-Hastings, variational inference or others The probabilistic model is a hierarchical model using Bayesian non-parametrics. The probabilistic model is a generative model which describes how to generate the observed data according to a hierarchical process. The probabilistic model represents each observation and describes how multiple observations come about given identities of people. This is done by using clusters of the observations, where the observations are the image features and the optional environment sensor data and optional names. The model assumes that observations of the same person are clustered in at least one cluster (for example, images of John wearing spectacles are clustered in a first cluster and images of John not wearing spectacles are clustered in a second cluster). Therefore given a certain number of people, there are at least as many clusters in the model. The image processor selects parameters, such as summary statistics, of each cluster initially at random, distributed according to prior beliefs specified in the probabilistic model and samples observations from the clusters. When the observed data is available the image processor reverses this process using Bayesian inference to find out how many people there are, to assign observations to clusters, and to assign names identities and names to the clusters.

The probabilistic model has three sub-models which are a naming model, an identity model and a context model. The context model takes into account that observations are not independent, so if you see one person at a given time you are more likely to see certain other people at the same time. By learning about context it becomes possible to improved recognition accuracy as well as to inform the user what context they are in, such as where the user is a visually impaired person. The context provides a signal to the other sub-models and the model is able to learn likely sequences of contexts as these occur over time. Each image has an associated context vector which is learnt and which specifies the predicted context for that image.

The naming model maps a plurality of possible names to the identities of the identity model.

The identity model comprises at least one identity per cluster and maps names to identities.

Once the inference has completed the image processor takes a decision 210 whether to compute one or more predictions. If the image processor is in a training phase, where predictions are not required, the process of FIG. 2 repeats as more images are captured. In this way, the process of FIG. 2 acts to train the probabilistic model where the training is either integral with use of the image processor for prediction or not. In order to decide whether to compute predictions at decision point 210 the image processor uses criteria and/or rules, such as a threshold number of iterations of the method of FIG. 2, or a threshold duration of use of the image processing system, or others.

Figure 3:
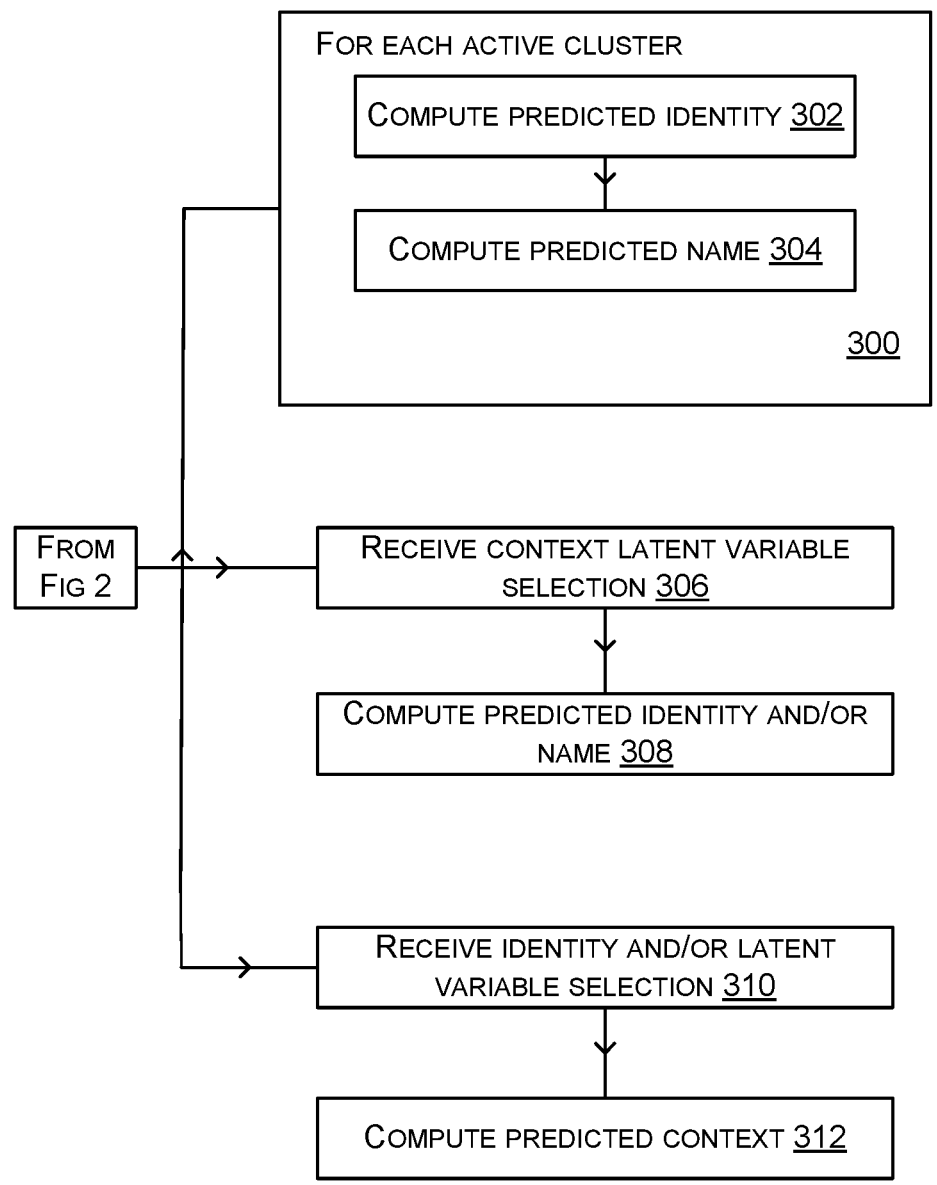
FIG. 3 is a flow diagram of part of the method of FIG. 2 in more detail.

In the case that the decision is made to compute one or more predictions the method moves to the process of FIG. 3.

For each active cluster 300 the image processor computes 302 a predicted identity and optionally a predicted name 304. An active cluster is a cluster of the probabilistic model which contains an observation from the current image. This enables the image processor to output predicted names and identities as indicated in FIG. 1.

If the image processor receives 306 a selected value of a context latent variable of the probabilistic model it computes 308 one or more predicted identities and/or names. For example, a user inputs a value of the context latent variable for a lunchtime context of the user and the image processor outputs identities and/or names of people the user is likely to encounter in that context. In some cases the image processor selects the value of the context latent variable automatically. For example, the image processor detects the current time of day and geographical location from the sensed environment data 104. Using the sensed environment data 104 it looks up an associated value of the context latent variable, and using that value it computes predicted people the user is likely to encounter.

If the image processor receives or computes a selection of an identity and/or name latent variable selection 310 it computes a predicted context 312. For example, a user enters an identity of a familiar stranger, such as familiar stranger 2 from FIG. 1. The image processor then computes a predicted context in which familiar stranger 2 is likely to be encountered. If the user in in a hotel and has lost his or her luggage, the user needs to find the baggage clerk who last had the luggage. By computing the context variable value for familiar stranger 2, who is the baggage clerk, the user is able to find the time of day and location for encountering the baggage clerk again.

Figure 4:
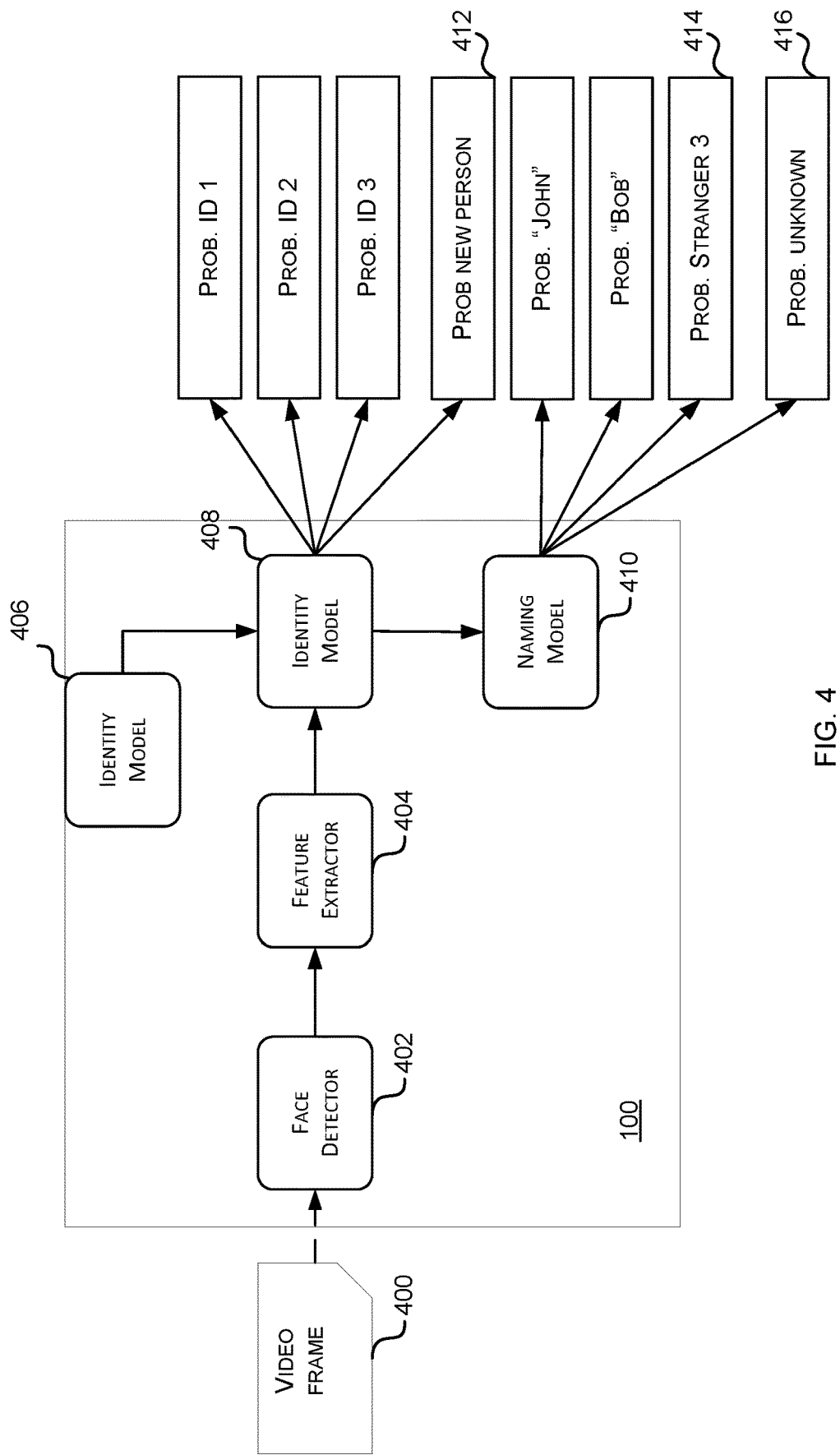
FIG. 4 is a schematic diagram of another example of an image processor.

FIG. 4 is a schematic diagram of the image processor 100 showing a video frame 400 input to the image processor 100 and where the image processor comprises a face or pose detector 402, a feature extractor 404, a context model 406, an identity model 408 and a naming model 410. The probabilistic model comprises three sub-models which are the context model 406, the identity model 408 and the naming model 410.

The video frame 400 is processed by the face and/or pose detector 402 to detect the regions of interest and extract features as described above with reference to FIG. 2. The extracted features, together with any name annotations and sensed environment data are input to the model 406, 408, 410 as described above, and predictions are computed. In FIG. 4 the predictions include a probability of each identity being depicted in the video frame and a probability of a new person 412 being in the video frame. In FIG. 4 the predictions include a probability of each name being the correct name for a person depicted in the video frame. The names include a familiar stranger name, which is familiar stranger 3, 414 and also a probability that the person depicted in the video is unknown 416. Predictions are also computed from the context model 406 in some cases although this is not illustrated in FIG. 4.

Figure 5:
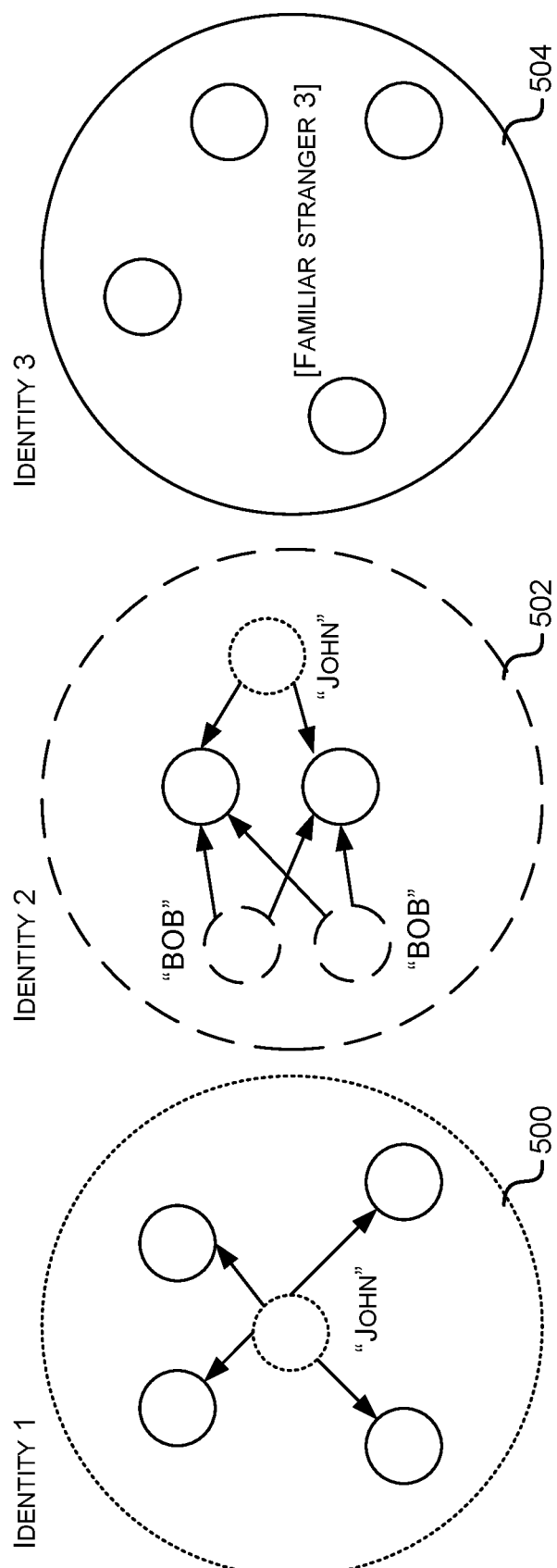
FIG. 5 is a schematic diagram of clusters computed by an image processor.

FIG. 5 shows an example of three clusters formed in the probabilistic model to aid understanding of the technology, although in practice there are many such clusters with at least one cluster per person encountered by the image processing system. In cluster 500 there are five observations associated with identity one, taken from five video frames or images. An observation comprises features extracted from the image and optionally also environment sensor data. As a result of user input the name "John" is assigned to one of the observations in cluster 500. The inference process assigns this name to all the other observations in the cluster 500.

In cluster 502 there are five observations associated with identity two, two of which have been assigned the name "Bob" by a user and one of which has been assigned the name "John" by a user. The probabilistic model takes into account noise in the name assignments in order to model the fact that there are sometimes errors in the name assignments made by humans. Taking into account this noise the inference process infers names for the un-named observations of cluster 502 and resolves any conflict so that all observations in the same cluster have the same name. This is done by dividing the cluster 502 and/or by renaming the already named observations.

In cluster 504 there are four observations associated with identity 3 and these observations are each named with the name "familiar stranger 3" since no name has been input by a user in connection with these observations.

Figure 6:
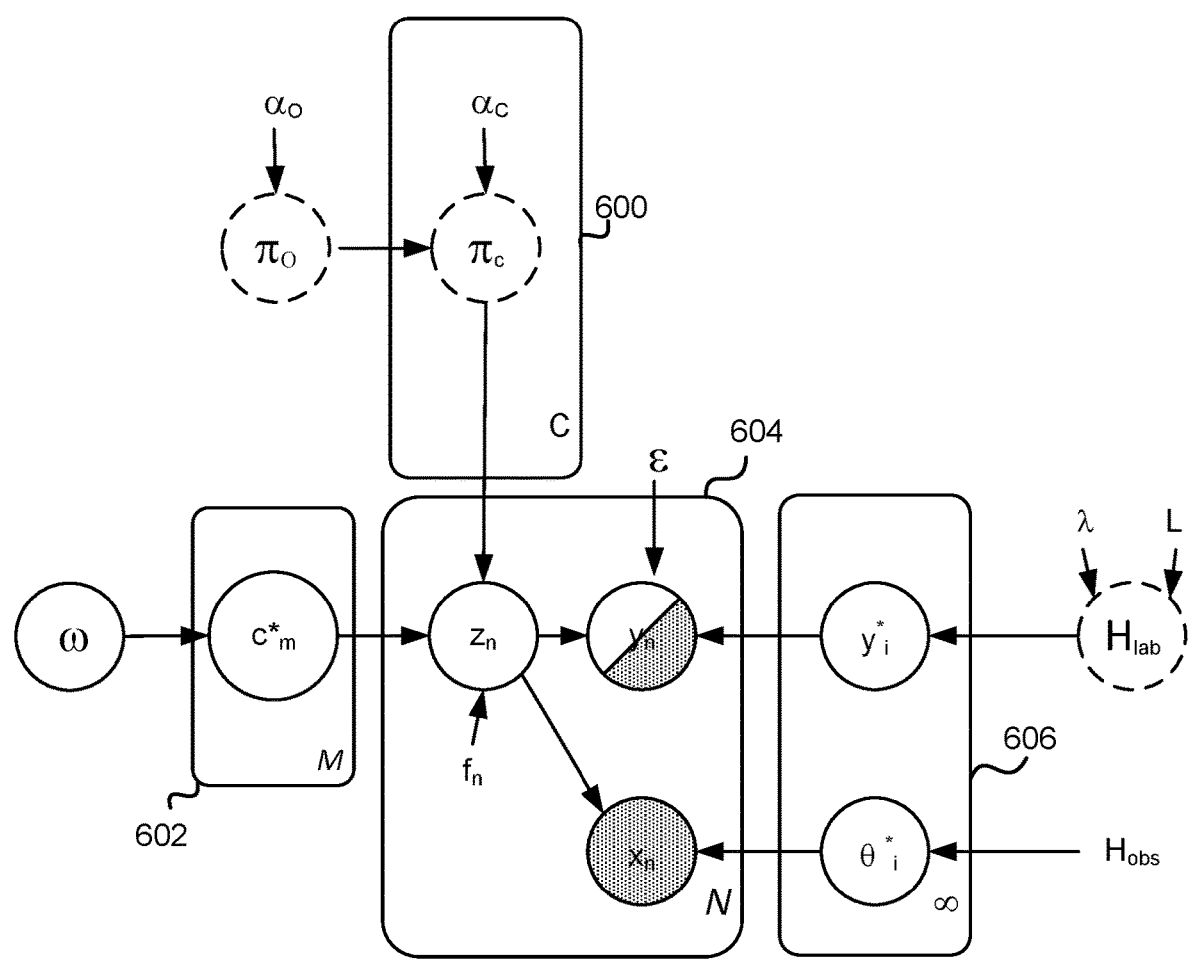
FIG. 6 is an example of a probabilistic model for use in the image processor of FIG. 1.

FIG. 6 is a graphical representation of an example probabilistic model used in the image processor 100. Each circle represents a variable of the model, where unfilled circles are latent unobserved variables and filled variables are observed. The half filled circle represents a variable which is sometimes observed and sometimes not observed (name of person depicted in the image). The variables are connected together by arrows where the arrows indicate the direction of the generative procedure assumed by the model The rectangles 600, 602, 604, 606 are plates in plate notation and represent variables which are repeated. Plate 602 is repeated once for each image or frame, where the total number of images or frames observed so far is M. FIG. 6 does not show the repeated plates 602 as these are stacked under plate 602. Plate 600 is repeated once for each context, where the number of contexts is fixed in advance on the basis of empirical data. Plate 604 is repeated once for each observation where the total number of observations is N across all frames. If there is more than one person depicted in a frame that will make one observation per person. Plate 606 is repeated once for each name as there are a potentially infinite number of possible names. FIG. 6 is described in more detail later in this document.

Figure 7:
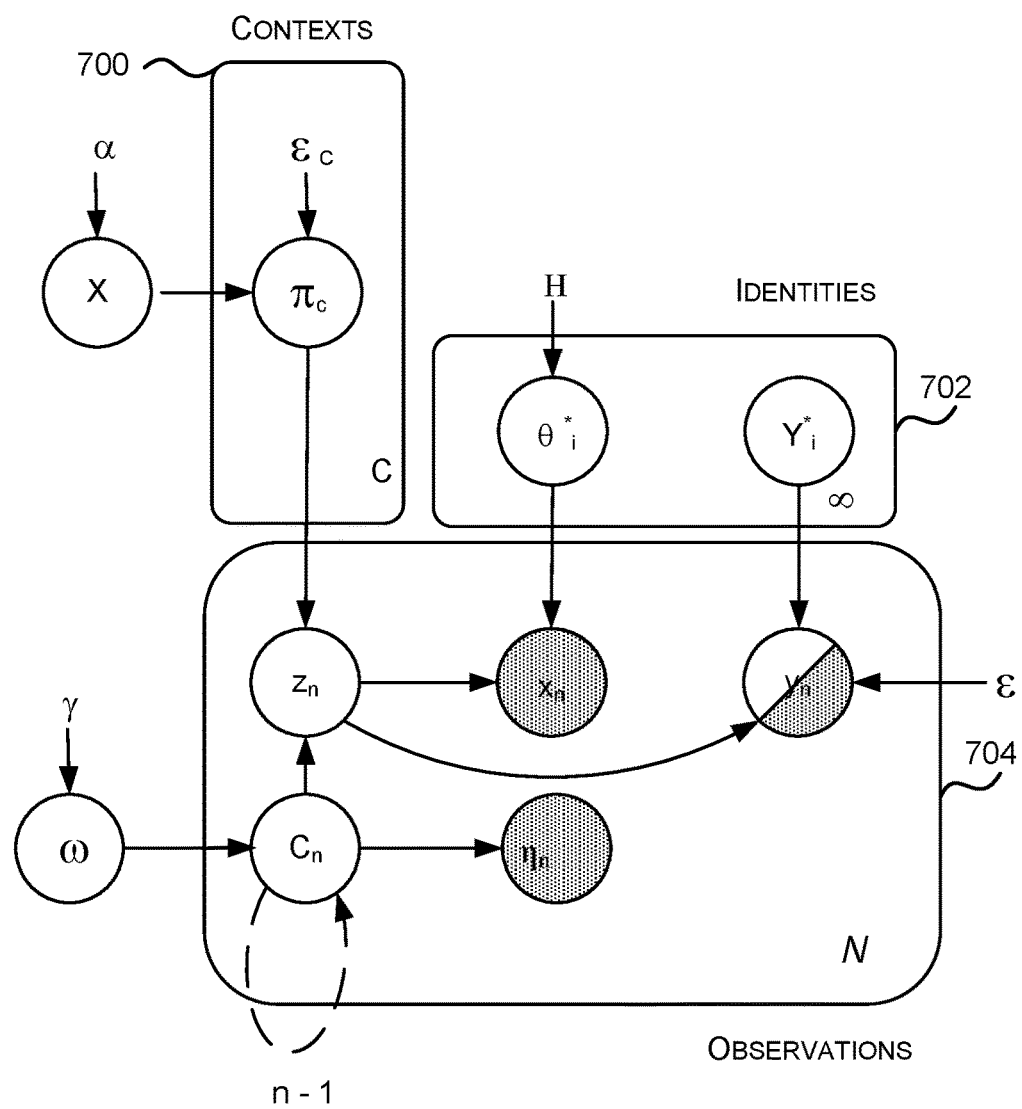
FIG. 7 is an example of another probabilistic model for use in the image processor of FIG. 1.

FIG. 7 is another example of a probabilistic model which is used by the image processor in some cases. The form of the model is different from that of FIG. 6 and illustrates the fact that many different forms of the probabilistic model are possible and that the scope of the technology is not limited to one particular detailed form.

In FIG. 7 the probabilistic model comprises an identity sub-model made up of observed face features $x_n$, identity assignment variables $z_n$, face or body pose features $\theta_i^*$, context-wise identity probabilities $\pi_C$, and global identity probabilities X. The symbol alpha denotes a generator of a probability distribution such as a Dirichlet process. The symbol H denotes the image from which the features are observed.

In FIG. 7 the probabilistic model comprises a context sub-model made up of current context variables $c_n$, environment variables $\eta_n$ from sensed environment data and context probabilities w.

In FIG. 7 the probabilistic model comprises a naming sub-model made up of names provided by a user $y_n$ and unique names $y_i^*$.

In FIG. 7 plate notation is used so that plate 700 is a short hand representing C such plates, plate 702 is a short hand representing a potentially infinite number of such plates and plate 704 represents N such plates, where N is the total number of observations to date and n denotes an observation.

Figure 8:
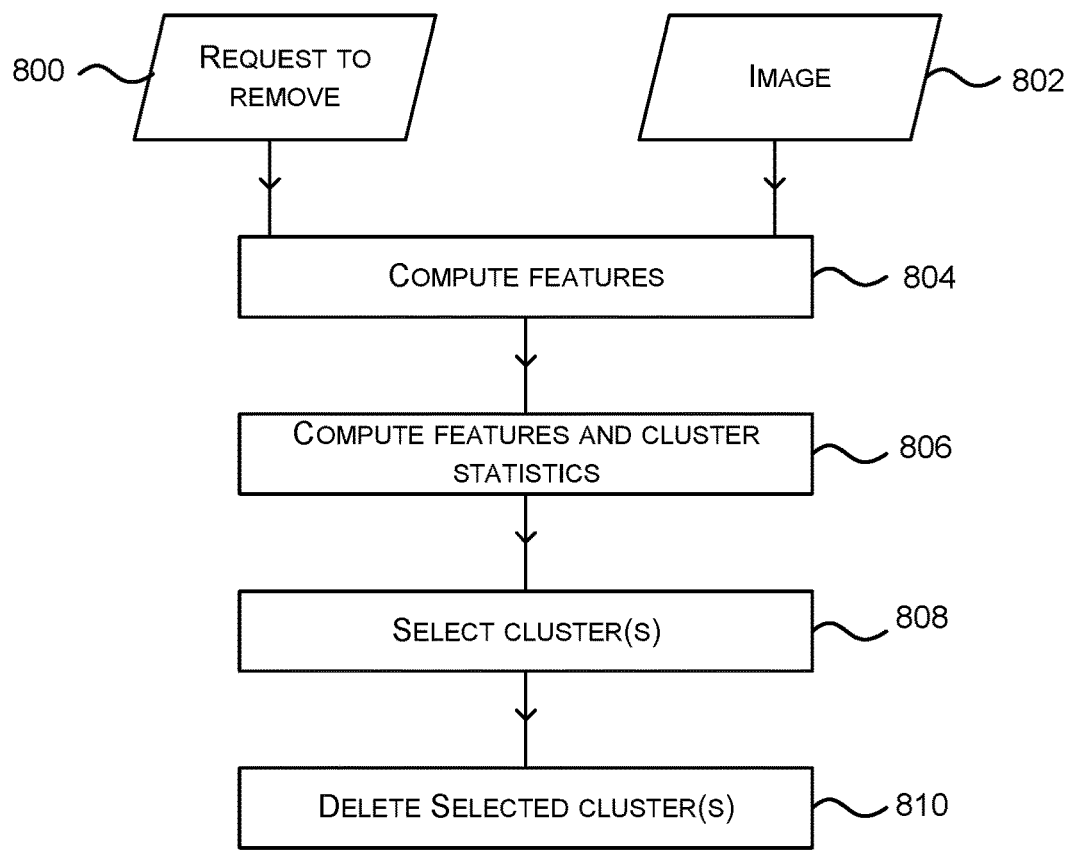
FIG. 8 is a flow diagram of a method of removing an identity or a person from the image processor of FIG. 1.

As mentioned above, the present technology uses images of people and users sometimes want to have their data removed. This is not straightforward since the latent variables of the probabilistic model are formed using data from many different observations. In order to provide a fast and effective way of removing a user's data from the probabilistic model, the process of FIG. 8 is used.

The image processing system 100 receives a request 800 to remove a person. The request comprises at least one image of the person 802 but does not specify the name of the person or the identity of the person as previously computed by the image processing system. The image processing system 100 computes 804 features from the image 802 using face detection and/or pose detection and a feature extraction process as mentioned above. The image processing system 100 compares 806 the features with summary statistics of clusters of the probabilistic model. One or more of the clusters are selected 808 on the basis of the comparison, for example, by selecting clusters which have a summary statistic which is the same as or similar to a statistic describing the extracted features. The selected cluster or clusters are then deleted 810 since these comprise observations of the person. In the case that the request 800 to remove the person comprises a name of the person or an identity of the person, the image processor is able to select the clusters at operation 808 using the name and/or identity. The selected clusters are then deleted at operation 810.

Figure 9:
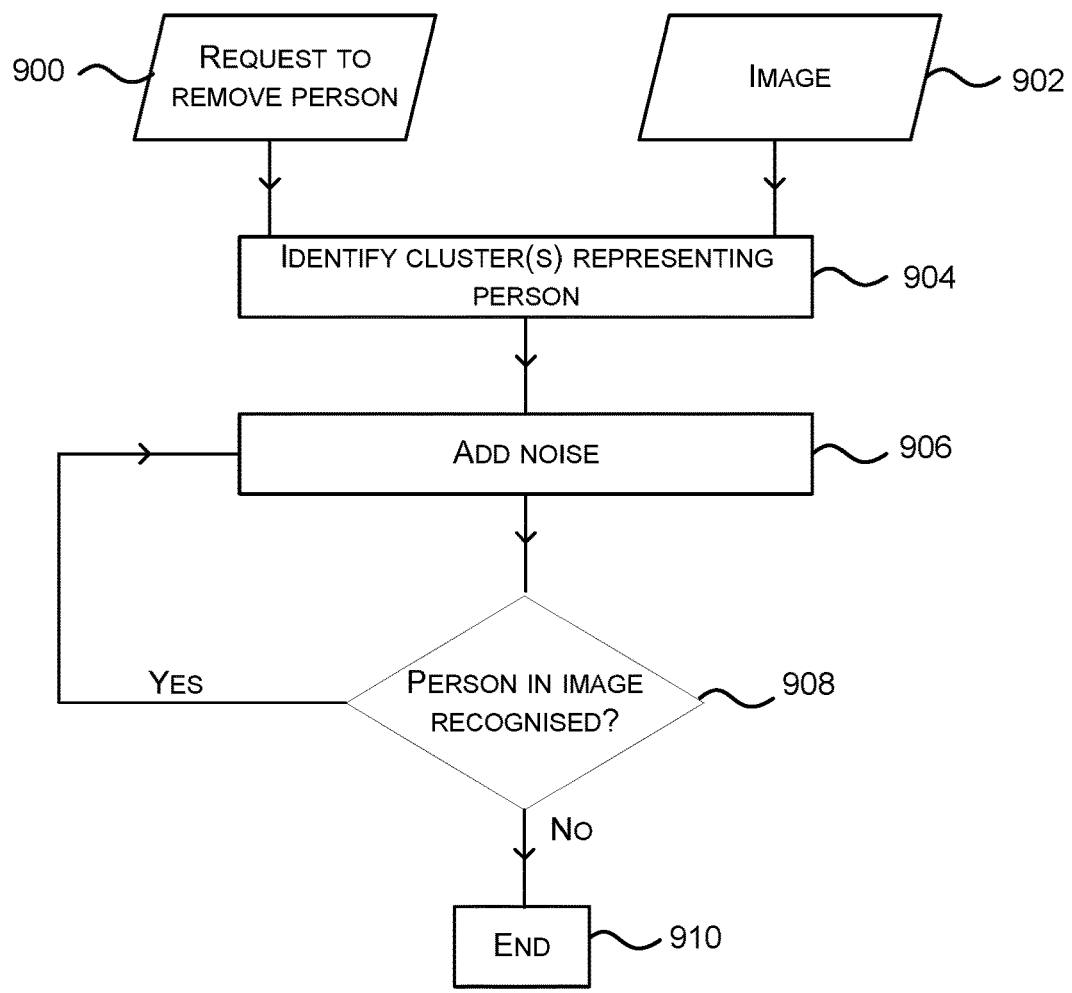
FIG. 9 is a flow diagram of another method of removing an identity or a person from the image processor of FIG. 1.

Another fast and effective way of removing a user's data from the probabilistic model is now described with reference to FIG. 9. A request to remove a person is received 900 together with an image 902 of the person to be removed. The image processing system identifies 904 one or more clusters representing the person within the probabilistic model. The identification is done using the process of FIG. 8 whereby features are extracted and compared with summary statistics of the clusters. The identification is done using a name or identity of the person if available in the request 900.

Noise is added to the identified clusters at operation 906. A test is made 908 to see if the image processor is able to recognize the person depicted in image 902. If so, the method adds more noise 906 to the identified clusters. The operations 906 and 908 are repeated until the person in mage 902 is no longer recognized by the image processor 100 at which point the process ends 910.

Figure 10:
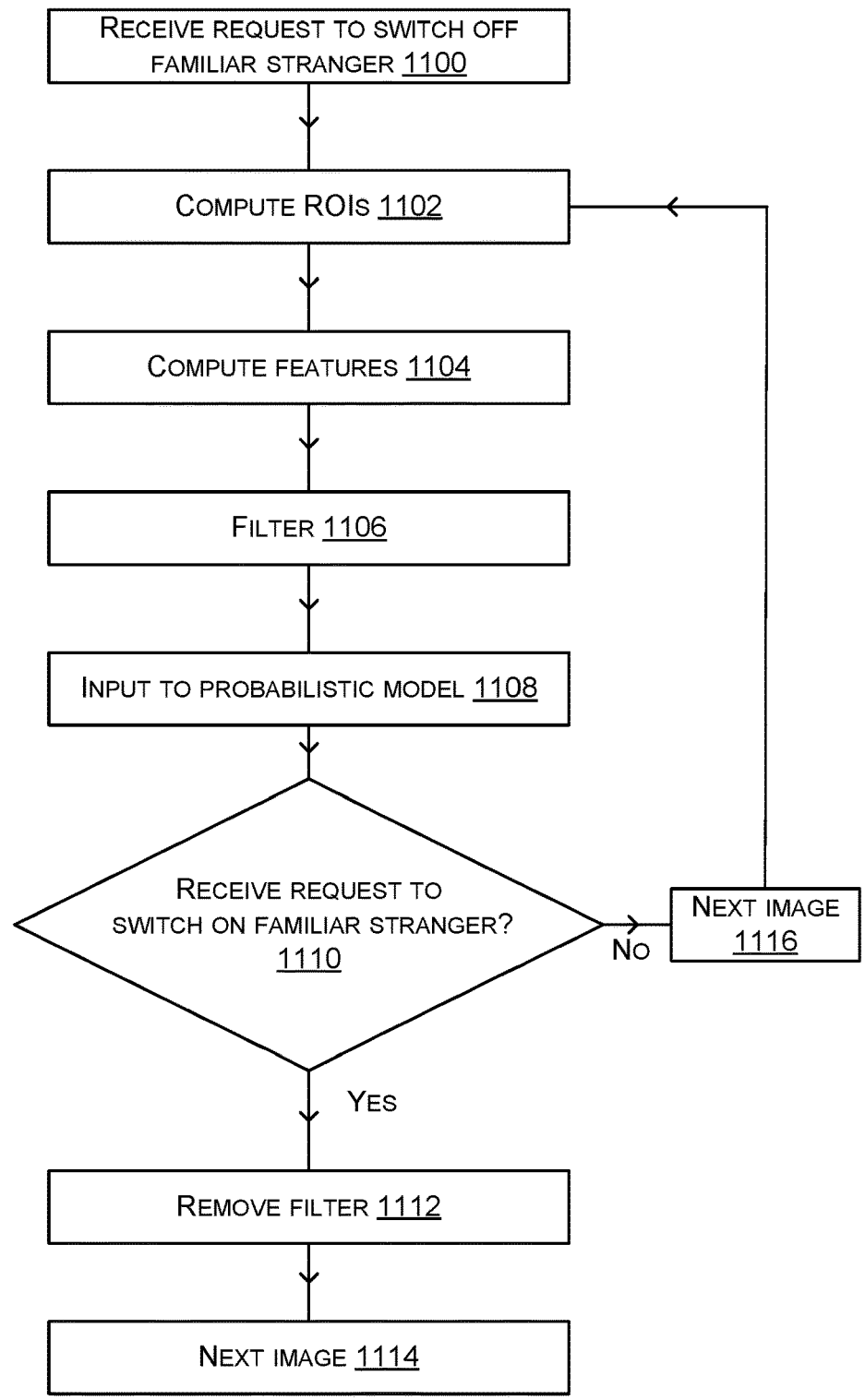
FIG. 10 is a flow diagram of a method of switching on or off a familiar stranger functionality of the image processor of FIG. 1.

In an embodiment the image processor has the ability to switch on or off the familiar stranger functionality. This is now explained with reference to FIG. 10. Suppose the familiar stranger functionality is currently available whilst a user is at work. At the end of the day the user is travelling home by public transport and makes an input to the image processor to trigger switching off 1100 the familiar stranger function. The image processor activates a filter operation 1106 in order to achieve this as now explained.

The image processor computes regions of interest 1102 in the current image as mentioned above and computes 1104 features from the regions of interest. The features are then passed to a filter 1106 which compares the features of each region of interest with the current clusters of the probabilistic model. If the features of a given region of interest are similar to a cluster that has no associated person's name, the region of interest is discarded. In this way features relating to familiar strangers are discarded. If the features of a given region of interest are similar to a cluster that has a person's name, the features are input to the probabilistic model 1108 as before and the probabilistic model is able to compute predictions about people depicted in the image who are already named in the probabilistic model. However, the probabilistic model is not able to compute predictions about those in the image who are not recognized, as these people are potentially familiar strangers.

If the image processor receives a request 1110 to switch on the familiar stranger function it removes the filter 1112 and proceeds to process the next image 1114. Otherwise the filter remains in use and the next image is processed 1116.

A detailed example is now given for the probabilistic model of FIG. 6 using mathematical notation as now explained.

A detailed example is now given. With respect to the probabilistic model of FIG. 6. In FIG. 6 half filled nodes correspond to partially observed variables (i.e. observed only for a subset of the indices) and dashed nodes indicate variables which are marginalized out in the inference implementation. The model is expressed in mathematical notation and explained in words as follows with respect to the context sub-model:

$$\omega \sim Dir(\gamma 1/C)$$

is expressed in words as, the random variable co which denotes the context probability is sampled from a Dirichlet probability distribution with parameter gamma times a vector of ones with length C, where gamma is a constant specified manually or using empirical data in advance. By including context C in the model context awareness is gained. Context awareness is useful for narrowing down likely categories and for disambiguation when local information is insufficient. Marginalizing over the contexts makes co-occurrence relations emerge and enables predictions to be made about people who tend to be seen in the same context. In the example of FIG. 6 a fixed number of contexts C is used and this facilitates the inference procedure as compared with allowing an unbounded number of contexts C.

$$c_m^* | \omega \sim Cat(\omega), m=1, \ldots, M$$

is expressed in words as the probability of the context of frame m, denoted $c_m^*$, given the context probability, is sampled from a categorical distribution over the context probabilities, where the frame m is from a set of M frames.

With respect to the identity sub-model of FIG. 6 the identity sub-model has $$\pi_0 \sim GEM(\alpha_0)$$

which means that a global identity probability $\pi_0$ is sampled from a Griffiths Engen-McCloskey (GEM) distribution of concentration parameter $\alpha_0$. The identity sub-model also has $$\pi_c | \pi_0 \sim DP(\alpha_c, \pi_0), c=1, \ldots, C$$

which means that the identity probability in context c, given the global identity probability, is sampled from a Dirichlet process (DP) with parameters $\alpha_c$, $\pi_0$ which are the global concentration parameter and the global identity probability, and where c denotes the context from the set of C contexts. The identity sub-model also comprises $$z_n | f_n, c^*, \{\pi_c\}_c \sim Cat(\pi_{c^*_{f_n}}), n=1, \ldots, N$$

which is expressed in words as, the identity assignment of observation n, given the frame number $f_n$, the context $c^*$, the identity probability given the context $\pi_c$, is sampled from a categorical distribution over the context-wise identity probability for the observation, where n is the observation from a set of N observations.

$$\theta_i^* \sim H_{obs}, i=1, \ldots, \infty$$

The face/body model parameters $\theta_i^*$ are sampled from $H_{obs}$ which is a Gaussian-inverse gamma prior for the means and variances of the isotropic Gaussian mixture components representing the prior probabilities of the face/body model parameters $\theta_i^*$ where i is from one to infinity.

$$x_n | z_n, \theta^* \sim F_{obs}(\theta_{z_n}^*), n=1, \ldots, N$$

The probability of the observed face features $x_n$ given the identity assignment of observation n and the face/body model parameters is sampled from isotropic Gaussian mixture components $F_{obs}$ representing the face/body model parameters per identity assignment where n is the observation from the set of N observations.

The model assumes that points within a cluster tend to be in the same class. Thus the model attaches a class label (i.e. a person's name) to each cluster, here denoted $\mathcal{Y}_i^*$. There is a single true label (person's name) $\tilde{y}_n$ for each observation which is equal to the most likely one of the possible names given the identity assignment for the observation. Thus $\tilde{y}_n = \mathcal{Y}_{z_n}^*$.

$$H_{lab} \sim DP(\lambda, L)$$

The prior probability of a label (i.e. person's name) $H_{lab}$ is sampled from a Dirichlet process with parameters $\lambda$ and L where L is a distribution over the label space (e.g. strings which are the names) which produces almost surely distinct samples and where $\lambda$ denotes the label concentration parameter, which controls the prior probability of unknown labels/names.

$$\mathcal{Y}_i^* | H_{lab} \sim H_{lab}, i1, \ldots, \infty$$

Which is expressed in words as, the probability of name i, denoted, $\mathcal{Y}_i^*$, given the probability of the label is sampled from the probability distribution over the label, where there are potentially an infinite number of names.

$$\mathcal{Y}_n | z_n, y^* \sim F_{lab}(\mathcal{Y}_{z_n}^*), n \in \mathcal{L}$$

Which is expressed in words as the probability of the name provided by the user $\mathcal{Y}_n$ given the identity assignment of observation n and a vector of the probabilities of the names y*, is sampled from $F_{lab}$ which is a noisy label distribution (which models the the fact that a user may make mistakes when providing names $y_n$ to the system) where n is the observation and is a member of the set of observed names $\mathfrak{L}$.

An example of the naming model is now described with reference to FIG. 6. The model assumes that the number of distinct labels (names) tends to increase without bounds as more data is observed. Therefore a further nonparametric prior on the cluster-wide labels is set as $$H_{lab} \sim DP(\lambda, L) \quad \text{equation 1}$$

Which means that the prior probability of a given name is sampled from a Dirichlet process with parameters $\lambda$ and L as mentioned above. Knowledge about the base label measure L and the random label prior $H_{lab}$ comes from the observed labels $y_\mathfrak{L}$.

$$G_0 | H_{lab} \sim DP(\alpha_0, H_{obs} \times H_{lab})$$

The probability of $G_0$ (where $G_0$ is a global Dirichlet process) given the probability of the label is sampled from a Dirichlet process with parameters $\alpha_0$, $H_{obs} \times H_{lab}$ which are the global concentration parameter, the prior probability distribution over observed labels and the prior probability distribution of the labels.

$$G_c | G_0 \sim DP(\alpha_c, G_o), c = 1, \ldots, C$$

The probability of $G_c$ given $G_0$, where $G_c$ is a context Dirichlet process, is sampled from a Dirichlet process with parameters $\alpha_c$, $G_o$ where c is the context in the set of fixed number of contexts C.

$$\omega \sim Dir(\gamma 1/C)$$

context probability $\omega$ is sampled from a Dirichlet probability distribution with parameter gamma times a vector of length C, where gamma is a constant specified manually or using empirical data in advance.

$$c_m | \omega \sim Cat(\omega), m = 1, \ldots, M$$

The context probability for frame m, $c_m$, given the context probability $\omega$, is sampled from a categorical distribution over the context probabilities, where m is between 1 and the total number of frames M.

$$(\theta_n, \tilde{y}_n) | f_n, c^*, \{G_c\}_c \sim G_{c^*_{f_n}}, n = 1, \ldots, N$$

The face/body parameters of observation n, paired with the observed names for that frame n, given the frame n, the context and the global context is sampled from $$G_{c^*_{f_n}}$$

which is the context-specific distribution over the face/body parameters ($\theta_n$) and true label/name ($\tilde{y}_n$) where n is between 1 and N the total number of observations.

$$x_n | \theta_n \sim F_{obs}(\theta_n), n = 1, \ldots, N$$

The observed face/body features of observation n, given the prior distribution over the face/body features for observation n is sampled from isotropic Gaussian mixture components $F_{obs}$ representing the face/body model parameters $$\mathcal{Y}_n | \tilde{y}_n \sim F_{lab}(\tilde{y}_n), n \in \mathfrak{L}$$

The probability of the observed label for observation n, given the $\tilde{y}_n$ which is the true label.

In the naming model, the random label distribution, $H_{lab}$ is marginalized out so that the predictive label distribution is $$\mathcal{Y}^*_\star \mid y^* \sim \frac{1}{\lambda + |y^*|}\left(\lambda L + \sum_i \delta_{\mathcal{Y}^*_i}\right), \quad \text{(equation 2)}$$

Which is denoted as
$\widetilde{H_{lab}}(\mathcal{Y}^*_\star | y^*)$.

This formulation allows more than one cluster to have the same label and also gives a principled estimate of the probability of encountering unseen labels without having to explicitly handle the unknown L distribution. Some of the learned clusters have no name assigned to them by a user (unknown people). Thus during inference, when a label is sampled from L, it is assigned a special "unknown" label.

The naming model incorporates a label noise model which enables the system to gracefully handle conflicting labels for a cluster and mislabeling where a user makes an error when he or she assigns a name to an observation. The label noise model assumes that observed labels (names) are noisy completely at random with a fixed error rate E. An example label noise model is:

$$F_{lab}(l | \mathcal{Y}^*_i) = \begin{cases} 1 - \varepsilon, & l = \mathcal{Y}^*_i \\ \varepsilon \frac{H_{lab}(l)}{1 - H_{lab}(\mathcal{Y}^*_i)}, & l \neq \mathcal{Y}^*_i \end{cases} \quad \text{(equation 3)}$$

Which means that the probability of the label l given the cluster's assigned label is equal to one minus the fixed error rate if the label is equal to the cluster's assigned label, and otherwise is equal to the fixed error rate times the ratio of the prior probability of the label to one minus the prior probability of the cluster's assigned label. An observed label agrees with its cluster's assigned label with probability 1 minus the fixed error rate. Otherwise, it is assumed to come from a modified label distribution, where the prior probability distribution of the label is restricted and renormalized to exclude the cluster's assigned label. Equation 3 depends on the unobserved label prior $H_{lab}$ which is marginalized out to obtain equation four when the label is not equal to the cluster's assigned label.

$$E\left[\frac{H_{lab}(l)}{1 - H_{lab}(\mathcal{Y}^*_i)} \middle| y^*\right] = \frac{\widetilde{H_{lab}}(l | y^*)}{1 - \widetilde{H_{lab}}(\mathcal{Y}^*_i | y^*)}, \quad \text{(equation 4)}$$

The above equivalence arises from the fact that posterior weights in a Dirichlet process follow a Dirichlet distribution and are therefore neutral. Equation four thus gives a tractable form for the likelihoods of observed labels as follows:

$$\widetilde{F_{lab}}(l | \mathcal{Y}^*_i; y^*) = \begin{cases} 1 - \varepsilon, & l = \mathcal{Y}^*_i \\ \varepsilon \frac{\widetilde{H_{lab}}(l | y^*)}{1 - \widetilde{H_{lab}}(\mathcal{Y}^*_i | y^*)} & l \neq \mathcal{Y}^*_i \end{cases} \quad \text{(equation 5)}$$

Which is expressed in words as the estimated probability of label l given the cluster probability and the possible labels is equal to one minus the fixed error rate if the label is equal to the cluster's assigned label, and otherwise is equal to the fixed error rate times the ratio of $\widetilde{H_{lab}}$ the predictive probability of the label given the possible labels to one minus the predictive probability of the cluster's assigned label given the possible labels.

The model of FIG. 6 is used to compute predictions such as given below in equations 6 and 7:

$$p(\mathcal{Y}_{N+1}|z_{N+1},y^*) = \widetilde{F_{lab}}(\mathcal{Y}_{N+1}|\mathcal{Y}_{z_{N+1}}*;y^* \quad \text{(equation 6)}$$

Which is expressed in words as the probability of the name of the next observation, given the probability of the next identity assignment ($z_{N+1}$) and given the possible names is equal to the estimated probability of the name of the next observation given the cluster name and the possible names.

$$p(\mathcal{Y}_{N+1}|x_{N+1},c_{N+1},c^*,z,y^*,\theta^*) = \Sigma_{z_{N+1}} p(\mathcal{Y}_{N+1}|z_{N+1}, y^*) p(z_{N+1}|x_{N+1},c_{N+1},c^*,z,\theta^* \quad \text{(equation 7)}$$

Which is expressed in words as the probability of the next name given the next observed face/body features and the next context is equal to the sum over all the values of the name assignment variable of the probability of the next name times the probability of the next name assignment variable.

To predict labels of observations in a frame the model of FIG. 6 uses the following computation $$p(y\widetilde{\mathfrak{F}}_{M+1} \mid X_{\widetilde{\mathfrak{F}}M+1}) = \sum_{z_n} p(z_{\widetilde{\mathfrak{F}}M+1} \mid X_{\widetilde{\mathfrak{F}}M+1}) \prod_n p(y_n \mid z_n)$$

Which is expressed in words as, the probability of the labels of the observations in the next frame, given the observed face/body features of the next frame is equal to the sum over the observations of the next frame of the probability of the name assignments of the next frame given the observed face/body features of the next frame, times the product over the observations of the probability of the name given the name assignment probability.

Detail about the Gibbs sampler conditionals used in one implementation of the present technology are now given. These are one example only and are not intended to limit the scope of the technology.

A joint posterior is defined as:

$$p(z,c^*,y^*,\theta^*|\mathcal{Y}_{\mathfrak{L}},X)$$

The Markov chain state is augmented with weights of the global Dirichlet process $G_0$ such that the context Dirichlet Processes $G_c$ become conditionally independent and are sampled in parallel as:

$$\beta = (\beta_1, \ldots, \beta_I, \beta') \sim Dir(M_{0.1}, \ldots, M_{.I}, \alpha_0), \quad \text{(equation 8)}$$

Where I is the current number of distinct identities and $\beta'$ is the weight of $G_0$'s base measure.

With regard to the cluster assignments, for the unlabeled instances the model defines:

$$p(z_n \mid \mathcal{Y}_{\widetilde{\mathfrak{F}}}, X, z_{-n}, c^*, y^*, \theta^*) \propto \quad \text{(equation 9)}$$

$$\begin{cases} F_{obs}(x_n \mid \theta_i^*) \, p(z_n = i \mid z_{-n}, c^*), \\ \widetilde{F_{obs}}(x_n) \, p(z_n \text{ new} \mid z_{-n}, c^*), \end{cases}$$

Where $\widetilde{F_{obs}} = \int F_{obs}(x|\theta) H_{obs}(\theta) d\theta$, the prior predictive distribution of the observations.

$$p(z_n \mid z_{-n}, c^*) = \begin{cases} N_{c_n i}^{-n} + \alpha_{c_n} M_{\cdot i}, \\ \alpha_{c_n} \alpha_0 \end{cases}$$

$$p(z_n = i \mid z_{-n}, c^*, \beta) = \begin{cases} N_{c_n i}^{-n} + \alpha_{c_n} \beta_c \\ \alpha_{c_n} \beta' \end{cases}$$

Where $N_{ci} = |\{n: c_n = c \wedge z_n = i\}|$ i.e. the number of samples in context c assigned to cluster i and frame $M_{\cdot i}$ is the total number of context-wise clusters associated with global cluster i across all contexts.

Whenever an instance is assigned to a new cluster the global weights are updated. This is done by splitting the weight for a new cluster $\beta'$ according to a stick-breaking process whereby b is sampled from a Beta distribution Beta(1, $\alpha_0$) and then setting $\beta_{I+1} \leftarrow b\beta'$ and $\beta' \leftarrow (1-b)\beta'$.

To sample $M_{ci}$ the following operation is used $$M_{ci} = \sum_{m=1}^{N_{ci}} 1\left[u_m \leq \frac{\alpha_c \beta_c}{\alpha_c \beta_c + m}\right],$$

Where $\{u_m\}$ are uniformly sampled from [0,1].

For observations which have labels there is an additional term accounting for the likelihood of the observed label:

$$p(z_n | \mathcal{Y}_{\mathfrak{L}}, X, z_{-n}, c^*, y^*, \theta^*) \propto F_{obs}(x_n | \theta_{z_n}^*) \widetilde{F_{lab}}(y_n | y_{z_n}^*; y^*) p(z_n | z_{-n}, c^*). \quad \text{(equation 10)}$$

With respect to the contexts:

$$p(c_m^* | \mathcal{Y}_{\mathfrak{L}}, X, z, c_{-m}^*, y^*, \theta^*) \propto p(z_{\mathfrak{L}_m} | z_{-\mathfrak{L}_m}, c^*) p(c_m^* | c_{-m}^*), \quad \text{(equation 11)}$$

Where $p(z_{\mathfrak{L}_m} | z_{-\mathfrak{L}_m}, c^*)$ factorizes as a sequence of conditionals and $p(c_m^* | c_{-m}^*)$ is a Dirichlet posterior predictive distribution.

With respect to the labels $$p(y_i^* | \mathcal{Y}_{\mathfrak{L}}, X, z, c^*, y_{-i}^*, \theta^*) \propto$$

$$\widetilde{H_{lab}}(y_i^* | y_{-i}^*) \prod \widetilde{F_{lab}}(y_n | y_i^*; y^*) \propto \begin{cases} L_\ell^{-i} \widetilde{F_{lab}}(y_n | \ell; y^*), & y_i^* = \ell \text{ seen} \\ \lambda \widetilde{F_{lab}}(y_n | y^*), & \text{unknown } y_i^* \end{cases}$$

Where $L_\ell^{-i} = |\{j: j \neq i \wedge y_j^* = \ell\}|$ is the number of clusters with label $\ell$, excluding cluster i, and $\widetilde{F_{lab}}$ is the predictive distribution for the labels:

$$\widetilde{F_{lab}}(y | y^*) = \sum_\ell \widetilde{F_{lab}}(y | \ell; y^*) \widetilde{H_{lab}}(\ell | y^*) = \quad \text{(equation 12)}$$

$$\lambda \widetilde{F_{lab}}(y_n | ?; y^*) + \sum_\ell L_\ell \widetilde{F_{lab}}(y_n | \ell; y^*).$$

With respect to the component parameters $$p(\theta_i^* | \mathcal{Y}_{\mathfrak{L}}, X, z, c, y^*, \theta_{-i}^*) \propto H_{obs}(\theta_i^*) \prod_{n: z_n = i} F_{obs}(X_n | \theta_i^*),$$

is tractable and analytic when $F_{obs}$ and $H_{obs}$ are a conjugate pair.

Figure 11:
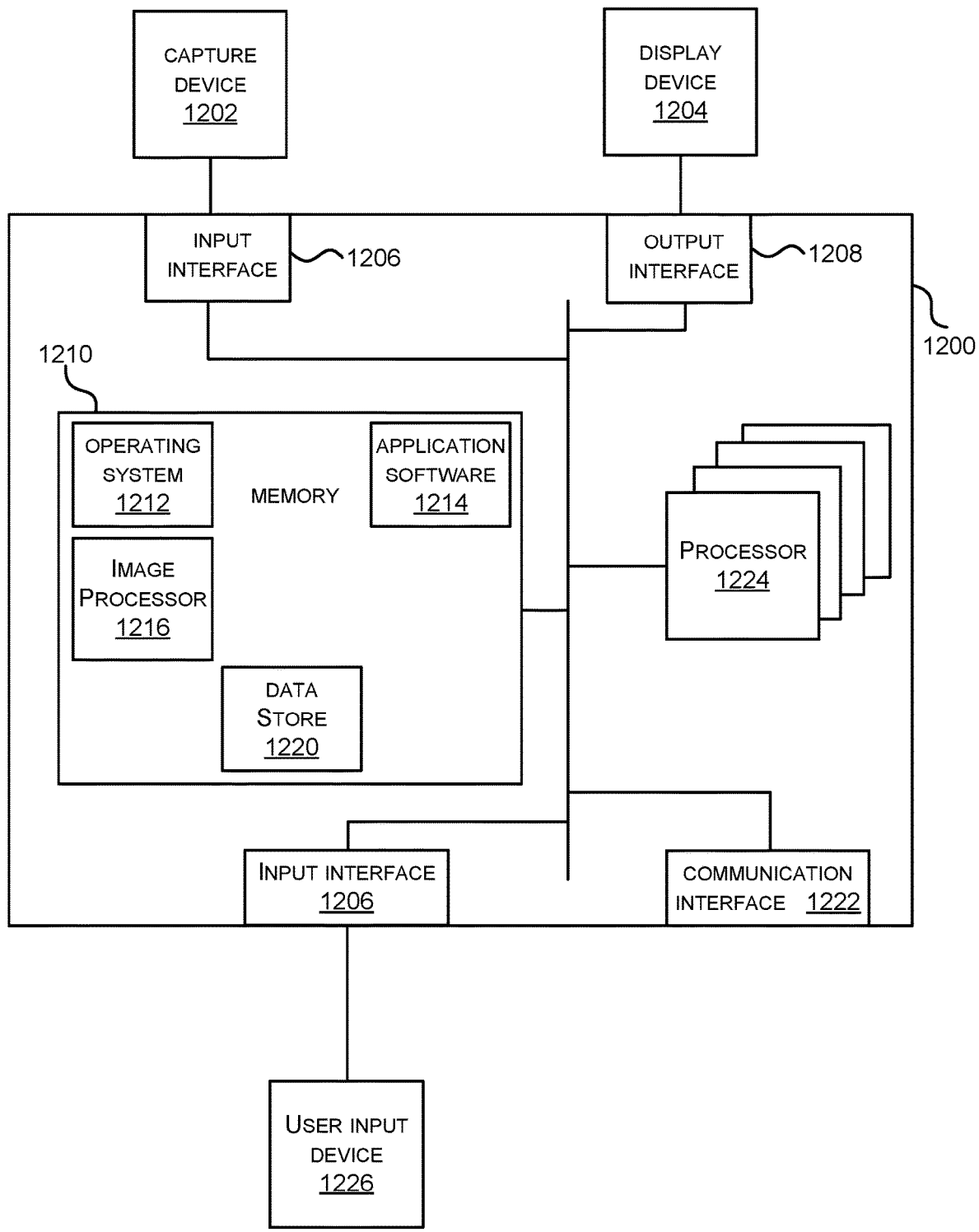
FIG. 11 illustrates an exemplary computing-based device in which embodiments of an image processor are implemented.

FIG. 11 illustrates various components of an exemplary computing-based device 1200 which are implemented as any form of a computing and/or electronic device, and in which embodiments of the image processor 100 are implemented in some examples.

Computing-based device 1200 comprises one or more processors 1224 which are microprocessors, controllers or any other suitable type of processors for processing computer executable instructions to control the operation of the device in order to predict one or more of: identities, names, contexts, given images depicting one or more people. In some examples, for example where a system on a chip architecture is used, the processors 1224 include one or more fixed function blocks (also referred to as accelerators) which implement a part of the method of any of FIGS. 2, 3, 8, 9, 10 in hardware (rather than software or firmware). Platform software comprising an operating system 1212 or any other suitable platform software is provided at the computing-based device to enable application software 1214 to be executed on the device. A data store 1220 holds images, video, names, identities, environment sensor data and other data where appropriate consent has been given. An image processor 1216 implements the functionality of image processor 100 described herein.

The computer executable instructions are provided using any computer-readable media that is accessible by computing based device 1200. Computer-readable media includes, for example, computer storage media such as memory 1210 and communications media. Computer storage media, such as memory 1210, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1210) is shown within the computing-based device 1200 it will be appreciated that the storage is, in some examples, distributed or located remotely and accessed via a network or other communication link (e.g. using communication interface 1222).

The computing-based device 1200 also comprises an input interface 1206 configured to receive data from a user input device, such as three dimensional graphics images, settings of parameter values, selections of search algorithms to be used and other user input. The input interface 1206 is arranged to receive and process input from one or more devices, such as a user input device 1226 (e.g. a mouse, keyboard, microphone or other sensor). In some examples the user input device 1226 detects voice input, user gestures or other user actions and provides a natural user interface (NUI). In an embodiment a display device 1204 acts as the user input device 1226 if it is a touch sensitive display device. The input interface 1206 receives input from a capture device 1202 in some examples, such as a depth camera, web camera, video camera or other capture device. The captured depth or color images and videos may be used to compute predictions as described herein.

An output interface 1208 outputs data to a loudspeaker or a display device 1204 such as a projector of an augmented reality computing device, a display screen or other display device. The output data comprises predictions such as predicted contexts, predicted identities, predicted names. The output interface 1208 outputs data to devices other than the display device 1204 in some examples, e.g. a locally connected printing device.

Any of the input interface 1206, output interface 1208, display device 1204 and the user input device 1226 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

An image processing system comprising:
a memory holding at least one image depicting at least one person previously unseen by the image processing system;
a trained probabilistic model which describes a relationship between image features, learnt context, identities and a plurality of names of people, wherein at least one of the identities identifies a person depicted in the image without an associated name in the plurality of names;
a feature extractor which extracts features from the image;
a processor which predicts an identity of the person depicted in the image using the extracted features and the probabilistic model.

By using both names and identities in the probabilistic model it is possible to predict familiar strangers. By using context in the probabilistic model it is possible to improve prediction accuracy since likely sequences of contexts are learnt.

In an example, the image processing system has been trained using images of people in which the names and identities of the people are unknown. This enables unsupervised training to be done so that the time and expense of supervised training is avoided.

In an example, the memory also stores sensed environment data associated with the image and the probabilistic model takes into account the sensed environment data. The sensed environment data provides additional context which improves the prediction accuracy.

In an example, the sensed environment data is time and/or location data.

In an example, the processor is configured to receive a request to remove data about a person from the probabilistic model, the request comprising at least one image of the person, and wherein the processor is configured to identify one or more clusters of the probabilistic model which are related to the image of the person and to delete the identified one or more clusters. This gives a fast and efficient way to remove someone from the system.

In an example, the processor is configured to receive a request to remove data about a person from the probabilistic model, the request comprising a least one image of the person, and wherein the processor is configured to add noise to summary statistics of clusters of the probabilistic model in an incremental manner until the probabilistic model is unable to predict an identity of the person from the image with a specified level of certainty. This enables fast and effective removal of a person from the system.

In an example the processor is configured to enable the ability to identify a person depicted in the image without an associated name in the plurality of names to be switched off, by omitting extracted features similar to clusters of the probabilistic model having no associated person's name. This is useful where there are privacy concerns.

In an example the trained probabilistic model comprises a plurality of clusters and the processor is configured to add noise to summary statistics of the clusters in dependence on recency of image features of the clusters. This gives time based forgetting which is useful where there are concerns about privacy of long term data.

In an example the probabilistic model comprises a plurality of interconnected sub-models, comprising: a context sub-model, an identity sub-model and a naming sub-model. Use of three sub-models is found to be particularly effective since the sub-models are implementable using different technologies and since the use of a naming model which is separate from an identity model facilitates familiar stranger functionality.

In an example the context sub-model comprises, for each of a plurality of training images used to train the probabilistic model, a latent variable representing the current context.

In an example, the identity sub-model comprises, for each of a plurality of training images used to train the probabilistic model, an observed variable representing features of the training image, a latent variable linking the observed variable to a plurality of context specific identity latent variables, and a global identity probability latent variable. This structure is found particularly effective for generating accurate predictions in an efficient manner.

In an example the naming sub-model comprises, a plurality of names of people and at least one variable representing a user provided name, provided by a user as being associated with a specified identity of the identity sub-model. The naming sub-model takes into account noise as the name provided by a user is sometimes wrong.

In an example, the naming sub-model is configured to add noise to the variable representing the at least one user provided name, to take into account the fact that the user provided name is uncertain. This facilitates accuracy of predictions since inconsistencies are dealt with through inference.

A computer-implemented method at an image processing system comprising:

storing at least one image depicting at least one person previously unseen by the image processing system;

storing a trained probabilistic model which describes a relationship between image features, context, identities, and a plurality of names wherein at least one of the identities identifies a person depicted in the image without an associated name in the plurality of names;

extracting features from the image;

computing a prediction of an identity of the person depicted in the image using the extracted features and the probabilistic model.

In an example, the method comprises selecting a value of an identity latent variable of the probabilistic model and computing a corresponding value of a current content latent variable of the probabilistic model given the selected value.

In an example the method comprises selecting a value of a current context latent variable of the probabilistic model and computing a corresponding value of each of the identity latent variables of the model.

In an example the method comprises selecting a value of a current context latent variable and a value of a plurality of identity latent variables of the probabilistic model and computing a corresponding value of a name latent variable of the probabilistic model.

A computer-implemented method at an image processing system comprising:

storing at least one image depicting at least one person previously unseen by the image processing system;

storing a trained probabilistic model which describes a relationship between image features, learnt context, and identities, where the trained probabilistic model comprises a plurality of clusters each cluster having summary statistics;

adding noise to summary statistics of at least one of the clusters;

extracting features from the image;

computing a prediction of an identity of the person depicted in the image using the extracted features and the probabilistic model.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'sub-model' is used herein to refer to part of a composite model formed from a plurality of sub-models.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. An image processing system comprising:
a memory comprising a cluster of images, wherein each image in the cluster of images depicts at least one person previously unseen by the image processing system;
a trained probabilistic model which describes a relationship between features in at least one image of the cluster of images, learnt context, identities and a plurality of names of people, wherein at least one of the identities identifies a person depicted in the at least one image of the cluster of images without an associated name in the plurality of names;
a feature extractor which extracts the features from the image of the cluster of images;
a processor programmed to:
predict an identity of the person depicted in the image using the extracted features and the trained probabilistic model;
assign the predicted identity to the extracted features; and
based on the assignment, assign the predicted identity to each unassigned feature in the cluster of images.

2. The image processing system of claim 1 wherein the trained probabilistic model has been trained using images of people in which the plurality of names and identities of the people are unknown.

3. The image processing system of claim 1 wherein the memory also stores sensed environment data associated with the at least one image of the cluster of images and wherein the trained probabilistic model takes into account the sensed environment data.

4. The image processing system of claim 3 wherein the sensed environment data is time and/or location data.

5. The image processing system of claim 1 wherein the processor is configured to receive a request to remove data about a person from the trained probabilistic model, the request comprising one or more images of the person, and wherein the processor is configured to identify one or more clusters of the trained probabilistic model which are related to the one or more images of the person and to delete the identified one or more clusters.

6. The image processing system of claim 1 wherein the processor is configured to receive a request to remove data about a person from the trained probabilistic model, the request comprising one or more images of the person, and wherein the processor is configured to add noise to summary statistics of clusters of the trained probabilistic model in an incremental manner until the trained probabilistic model is unable to predict an identity of the person from the one or more images with a specified level of certainty.

7. The image processing system of claim 1 wherein the processor is configured to enable an ability to identify a person depicted in the at least one image of the cluster of images without an associated name in the plurality of names to be switched off, by omitting extracted features similar to clusters of the trained probabilistic model having no associated person's name.

8. The image processing system of claim 1 wherein the trained probabilistic model comprises a plurality of clusters and wherein the processor is configured to add noise to summary statistics of the clusters in dependence on recency of image features of the clusters.

9. The image processing system of claim 1 wherein the trained probabilistic model comprises a plurality of interconnected sub-models, comprising: a context sub-model, an identity sub-model and a naming sub-model.

10. The image processing system of claim 9 wherein the context sub-model comprises, for each of a plurality of training images used to train the trained probabilistic model, a latent variable representing a current context.

11. The image processing system of claim 9 wherein the identity sub-model comprises, for each of a plurality of training images used to train the trained probabilistic model, an observed variable representing features of the training image, a latent variable linking the observed variable to a plurality of context specific identity latent variables, and a global identity probability latent variable.

12. The image processing system of claim 9 wherein the naming sub-model comprises, the plurality of names of people and at least one variable representing a user provided name, provided by a user as being associated with a specified identity of the identity sub-model.

13. The image processing system of claim 12 wherein the naming sub-model is configured to add noise to the variable representing the user provided name, to take into account a fact that the user provided name is uncertain.

14. A computer-implemented method at an image processing system, the method comprising:
    storing, at a memory, a cluster of images, wherein each image in the cluster of images depicts at least one person previously unseen by the image processing system;
    storing a trained probabilistic model which describes a relationship between features in at least one image of the cluster of images, context, identities, and a plurality of names wherein at least one of the identities identifies a person depicted in the at least one image of the cluster of images without an associated name in the plurality of names;
    extracting, using a processor, the features from the at least one image of the cluster of images;
    computing a prediction of an identity of the person depicted in the image using the extracted features and the trained probabilistic model;
    assigning the predicted identity to the extracted features; and
    based on the assignment, assigning the predicted identity to each unassigned feature in the cluster of images.

15. The method of claim 14 comprising selecting a value of an identity latent variable of the trained probabilistic model and computing a corresponding value of a current content latent variable of the trained probabilistic model given the selected value.

16. The method of claim 14 comprising selecting a value of a current context latent variable of the trained probabilistic model and computing a corresponding value of each identity latent variables of the trained probabilistic model.

17. The method of claim 14 comprising selecting a value of a current context latent variable and a value of a plurality of identity latent variables of the trained probabilistic model and computing a corresponding value of a name latent variable of the trained probabilistic model.

18. The method of claim 14 comprising training the trained probabilistic model using unsupervised training.

19. The method of claim 14 comprising receiving a request to remove data about a person from the trained probabilistic model, the request comprising a least one image of the person, and in response to the request adding noise to summary statistics of clusters of the trained probabilistic model in an incremental manner until the trained probabilistic model is unable to predict an identity of the person from the at least one image of the cluster of images with a specified level of certainty.

20. A computer-implemented method at an image processing system comprising:
    storing a cluster of images, wherein each image in the cluster of images depicts at least one person previously unseen by the image processing system;
    storing a trained probabilistic model which describes a relationship between features in at least one image of the cluster of images, learnt context, and identities, where the trained probabilistic model comprises a plurality of clusters each cluster having summary statistics;
    adding noise to summary statistics of at least one of the clusters;
    extracting the features from the image;
    computing a prediction of an identity of the at least one person depicted in the at least one image of the cluster of images using the extracted features and the trained probabilistic model;
    assigning the predicted identity to the extracted features; and
    based on the assignment, assigning the predicted identity to each unassigned feature in the cluster of images.

* * * * *